United States Patent
Silveri et al.

(10) Patent No.: US 7,713,164 B2
(45) Date of Patent: May 11, 2010

(54) DOUBLE STEP GEAR SHIFTING IN A HYBRID ELECTRIC VEHICLE

(75) Inventors: Andrew J. Silveri, Royal Oak, MI (US); Ihab S. Soliman, Warren, MI (US); Deepak Aswani, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 451 days.

(21) Appl. No.: 11/821,833

(22) Filed: Jun. 26, 2007

(65) Prior Publication Data

US 2009/0005215 A1 Jan. 1, 2009

(51) Int. Cl.
*B60W 10/02* (2006.01)
*B60W 10/04* (2006.01)

(52) U.S. Cl. ..................... 477/5; 180/65.285

(58) Field of Classification Search ............. 477/3, 477/5, 6; 180/65.285; 74/335
See application file for complete search history.

(56) References Cited

U.S. PATENT DOCUMENTS

| | | | |
|---|---|---|---|
| 6,941,830 B2 * | 9/2005 | Ibamoto et al. ............... 74/339 |
| 7,086,301 B2 * | 8/2006 | Sakamoto et al. ............. 74/335 |
| 2001/0044683 A1 * | 11/2001 | Takaoka et al. ............... 701/22 |
| 2002/0189397 A1 * | 12/2002 | Sakamoto et al. ............. 74/661 |
| 2004/0147365 A1 * | 7/2004 | Komeda et al. ................ 477/6 |
| 2005/0009665 A1 | 1/2005 | Cho |
| 2005/0064987 A1 * | 3/2005 | Budal et al. .................... 477/3 |
| 2005/0164827 A1 | 7/2005 | Beaty et al. |

FOREIGN PATENT DOCUMENTS

| DE | 102007000664 A1 | 5/2008 |
|---|---|---|
| GB | 2446919 A | 8/2008 |

* cited by examiner

*Primary Examiner*—Roger Pang
(74) *Attorney, Agent, or Firm*—David B. Kelley; MacMillan, Sobanski & Todd, LLC

(57) ABSTRACT

In a powertrain for a vehicle that includes an engine, a transmission having an input, a current gear, an input clutch, a target gear and an output for driving a load, and an electric machine for driving the load, a method for performing a gearshift from the current gear to the target gear comprising the steps of opening the input clutch, releasing a drive connection between the current gear and the output, producing a drive connection between the target gear and the output, using the electric machine to produce torque at the load, closing the input clutch; and reducing the torque produced by the electric machine.

21 Claims, 6 Drawing Sheets

DOUBLE STEP GEAR SHIFTING IN A HYBRID ELECTRIC VEHICLE

BACKGROUND OF THE INVENTION

1. Field of the Invention

This invention relates generally to a powertrain for a hybrid electric vehicle having an engine, an electric machine and a multiple-speed, powershift transmission. In particular, the invention pertains to controlling double-step gear shifts in the transmission.

2. Description of the Prior Art

A powershift transmission is a geared mechanism employing two input clutches used to produce multiple gear ratios in forward drive and reverse drive. It transmits power continuously using synchronized clutch-to-clutch shifts.

The transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

In a hybrid electric vehicle (HEV) whose powertrain includes a powershift transmission power is supplied from multiple power sources including an engine, and two electric machines: a crank integrated starter/generator (CISG) and an electric rear axle drive (ERAD).

The CISG, which may be located in a drive path between the engine and the transmission input, function as a conventional alternator and starter, and provides torque assist.

The ERAD interfaces with the transmission output and provides torque to the rear driveline for electric-only drive and power boost. The ERAD also provides regenerative recovery of vehicle kinetic energy through the rear driveline while braking the vehicle wheels.

Gear shift between two even-numbered gears or between two odd-numbered gears are referred to a "double step shifts." When performing double step shifts between gears on the same layshaft, a powershift transmission can produce brief, sharp reductions in power at the transmission input, sometimes referred to a "torque holes." Torque holes are perceived by the vehicle's occupants as a transient period of harsh shifting.

There is a need in the industry for a technique that reduces or eliminates torque holes when performing double step shifts with a powershift transmission.

SUMMARY OF THE INVENTION

The control method uses the ERAD motor to provide torque to the wheels during a double step shift, thereby providing means to complete the double step shift involving only a single clutch. This method will significantly improve the double step shift event time.

The control system and method eliminates torque holes, providing positive torque and providing the sensation of performing a gear shift in a conventional automatic transmission.

The control significantly shortens the period for performing a downshift in heavy driver demand conditions, and improves responsiveness in change-of-mind shifts, i.e., when the vehicle operator changes between tip-in and tip-out of the accelerator pedal.

A powertrain operating under the control will experience enhanced durability of the input clutches and synchronizers due to their being used less in heavy driver demand conditions.

The control method can be used to perform the same gearshift if one input clutch or its layshaft is damaged, whereas in a conventional powertrain subject to a performance restriction of the transmission operation is limited to a single gear.

If the vehicle operator has a "change of mind" and tips out of the throttle, the change of mind shift event occurs much faster. When the tip-out occurs, a change of mind gear shift control strategy will return to fifth gear, which will again be a same shaft shift event. In a conventional vehicle this would require additional steps, since the power flow would have been transferred to the even shaft and another transfer back to the odd shaft would be needed.

In a powertrain for a vehicle that includes an engine, a transmission having an input, a current gear, an input clutch, a target gear and an output for driving a load, and an electric machine for driving the load, a method for performing a gearshift from the current gear to the target gear comprising the steps of opening the input clutch, releasing a drive connection between the current gear and the output, producing a drive connection between the target gear and the output, using the electric machine to produce torque at the load, closing the input clutch; and reducing the torque produced by the electric machine.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
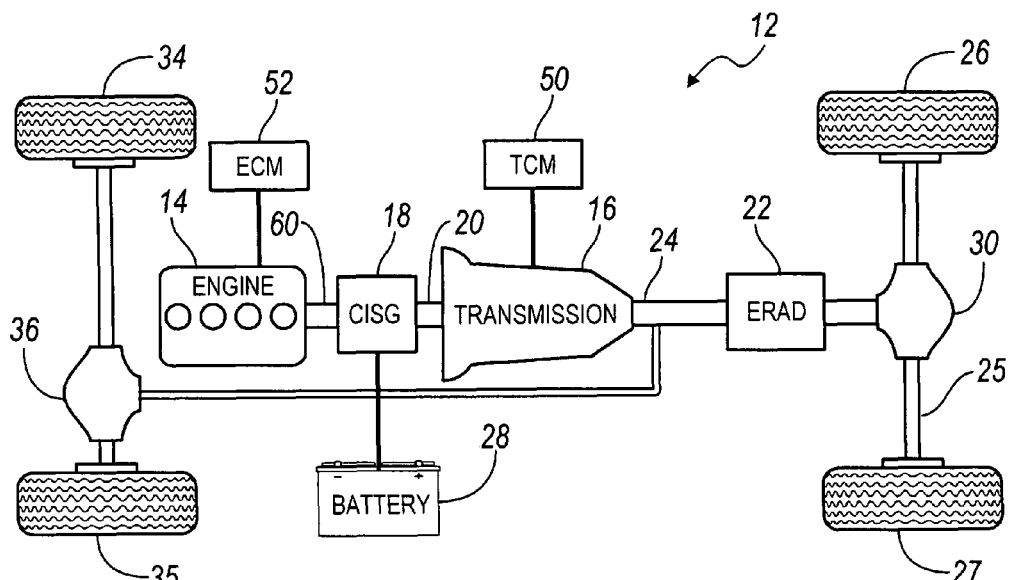
FIG. 1 is a schematic diagram of a vehicle powertrain.
Figure 2:
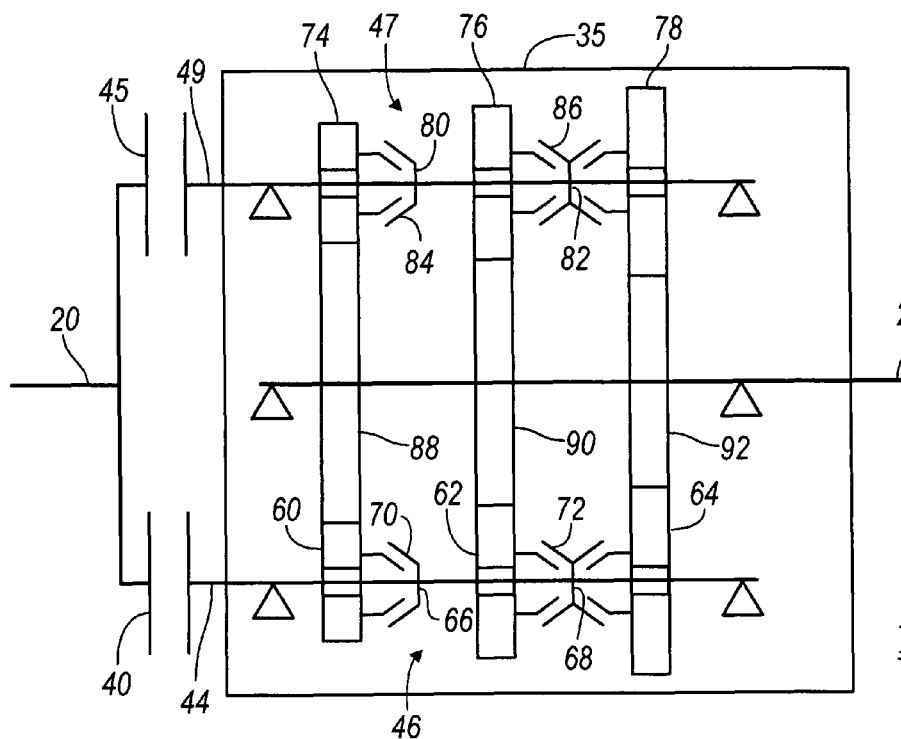
FIG. 2 is a schematic diagram showing additional details of a dual input clutch powershift transmission and the vehicle powertrain of FIG. 1.

As shown in FIGS. 1 and 2, a HEV powertrain 12 includes an engine 14, such as a diesel or gasoline engine; a transmission 16, such as dual input clutch powershift transmission or another multiple speed transmission having no torque converter; a first electric machine 18, such as a CISG, driveably connected to the transmission input 20; and a second electric machine 22, such as an electric motor or ERAD, driveably connectable to the transmission output 24 and a rear axle 25.

ERAD 22 is located near a vehicle axle 25 and provides propulsion capability to axle 25 in either an electric drive operating mode or a hybrid drive operating mode. Power output by ERAD 22 drives vehicle wheels 26, 27 through ERAD gearing and a final drive unit 30, such as an inter-wheel differential mechanism. Similarly, the transmission output 24 may be driveably connectable to a second set of vehicle wheels 34, 35 through a drive unit 36, which includes an inter-wheel differential mechanism.

Figure 6:
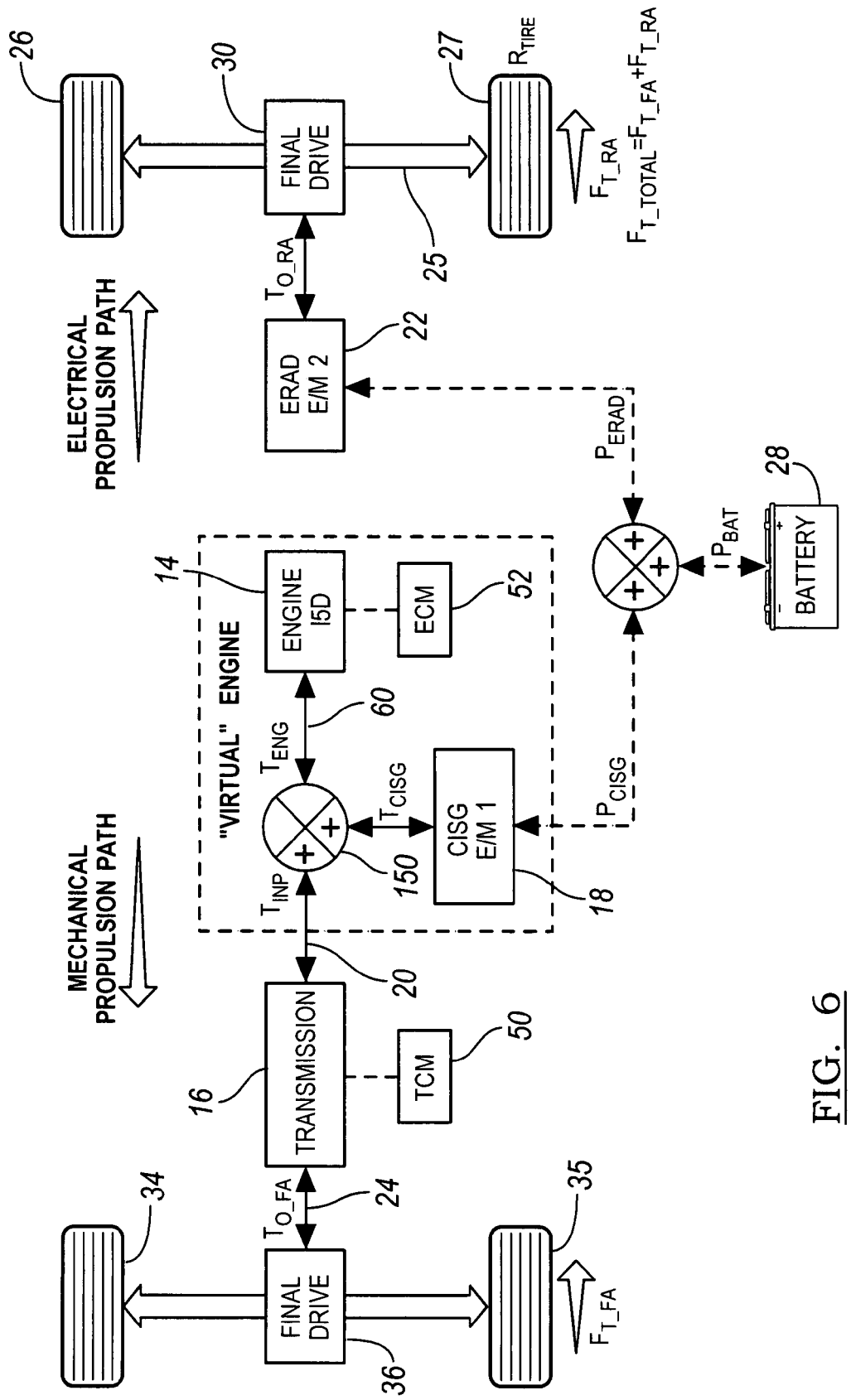
FIG. 6 is a schematic diagram of a second embodiment of a vehicle powertrain.

Alternatively, in a second embodiment, transmission output 24 is connected to the front wheels 34, 35 but not to the rear wheels 26, 27, in which case ERAD 22 drives the rear wheels but not the front wheels. FIG. 6 illustrates the second embodiment.

Figure 7:
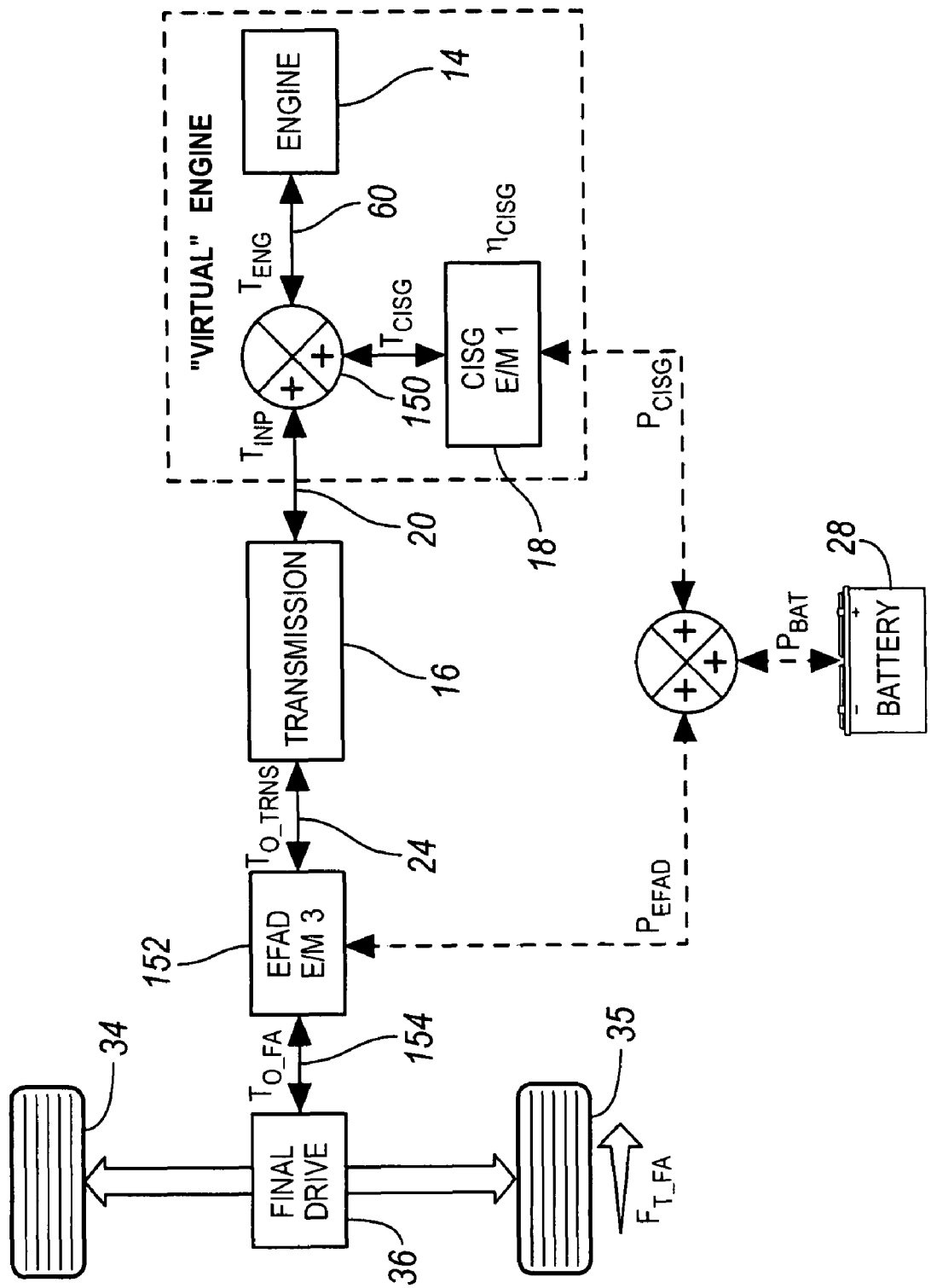
FIG. 7 is a schematic diagram of a third embodiment of a vehicle powertrain.

In third embodiment, transmission output 24 is connected to the front wheels 34, 35 but not to the rear wheels 26, 27, ERAD 22 is deleted, and a third electric machine 152, such as an electric front axle drive (EFAD) is driveably connected to the front wheels 34, 35. FIG. 7 illustrates the third embodiment.

CISG 18 is used to crank the engine 14 during an engine starting procedure. CISG 18 and ERAD 22 are used to recharge a battery 28 when the CISG is driven by the engine or by the ERAD, or the CISG or ERAD or both the CISG and ERAD are driven by the wheels of the vehicle.

FIG. 2 illustrates details of the transmission 16 including a first input clutch 40, which selective connects the input 20 of transmission 16 alternately to the even-numbered gears 46 associated with a first layshaft 44, and a second input clutch 45, which selective connects the input 20 alternately to the odd-numbered gears 47 associated with a second layshaft 49.

An electronic transmission control module (TCM) 50 controls the input clutches 40, 45 through command signals sent to solenoid-actuated servos, which actuate the input clutches. An electronic engine control module (ECM) 52 controls operation of engine 14. The TCM 50 and ECM 52 each includes a microprocessor accessible to electronic memory and containing control algorithms expressed in computer code, which are executed repeatedly at frequent intervals.

Shaft 44 supports pinions 60, 62, 64, which are each journalled on shaft 44, and couplers 66, 68, which are secured to shaft 44. Pinions 60, 62, 64 are associated respectively with the second, fourth and sixth gears. Coupler 66 includes a sleeve 70, which can be moved leftward to engage pinion 60 and driveably connect pinion 60 to shaft 44. Coupler 68 includes a sleeve 72, which can be moved leftward to engage pinion 62 and driveably connect pinion 62 to shaft 44 and can be moved rightward to engage pinion 64 and driveably connect pinion 64 to shaft 44.

Shaft 49 supports pinions 74, 76, 78, which are each journalled on shaft 49, and couplers 80, 82, which are secured to shaft 49. Pinions 74, 76, 78 are associated respectively with the first, third and fifth gears. Coupler 80 includes a sleeve 84, which can be moved leftward to engage pinion 74 and driveably connect pinion 74 to shaft 49. Coupler 82 includes a sleeve 86, which can be moved leftward to engage pinion 76 and driveably connect pinion 76 to shaft 49 and can be moved rightward to engage pinion 78 and driveably connect pinion 78 to shaft 49.

Output 24 supports gears 88, 90, 92, which are each secured to shaft 24. Gear 88 meshes with pinions 60 and 74. Gear 90 meshes with pinions 62 and 76. Gear 92 meshes with pinions 64 and 78.

Couplers 66, 68, 80 and 82 may be synchronizers, or dog clutches or a combination of these.

Figure 3:
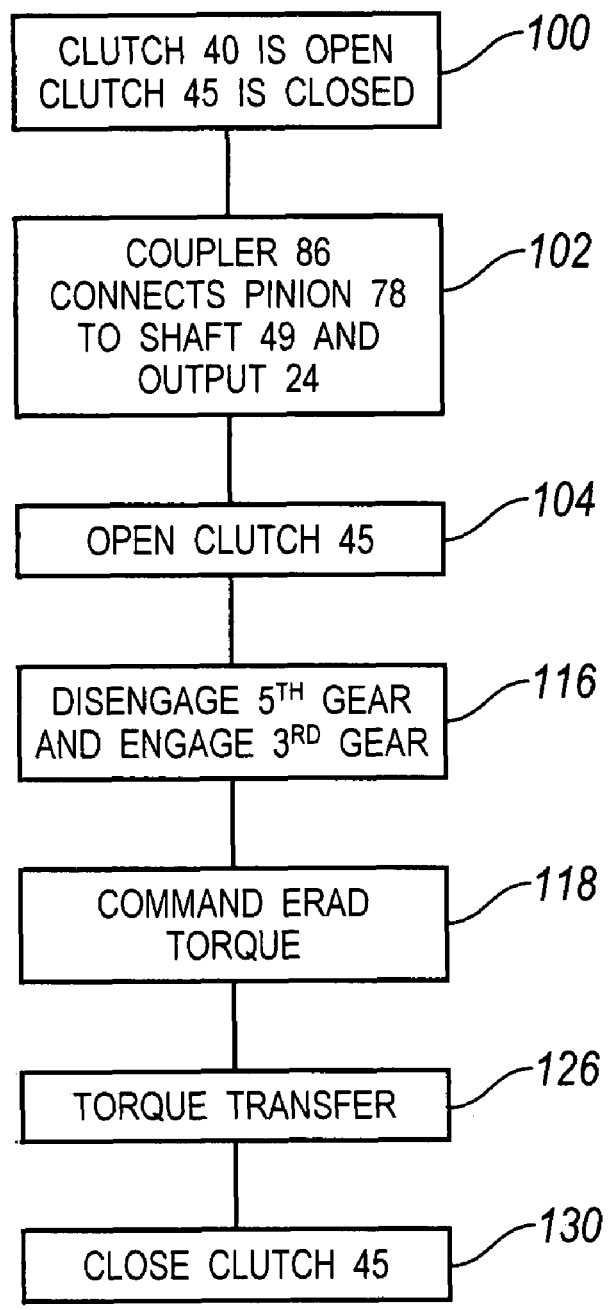
FIG. 3 shows the steps for performing a double-step gearshift from fifth gear to third gear.

FIG. 3 shows the steps for performing and controlling a power-on, double-step gearshift from fifth gear to third gear in a powershift transmission 16 located in powertrain 12 using ERAD 22 to participate in the gearshift. Note that the engagement of fourth gear and activation/deactivation of two input clutches is not required.

When transmission 16 is operating in fifth gear, at step 100, the sleeve 86 of coupler 82, is engaged with pinion 78, input clutch 40 is fully disengaged or open, and input clutch 45 is fully engaged. With transmission 16 so disposed, at step 102, coupler 86 connects pinion 78 to input 20 through clutch 45 and shaft 49, and pinion 78 is driveably connected to wheels 26, 27, which drive the vehicle or load, through gear 92, output 24, ERAD 22 and drive unit 30 in fifth gear, or to wheels 34, 35 or to wheels 26, 27, 34 and 35.

A double step downshift of transmission 16 from fifth gear to third gear begins at step 104 by opening clutch 45. FIG. 4B shows that the torque capacity of input clutch 45 is reduced first at a step 108, is then reduced further along a ramp 110 to a magnitude 112, which is held constant for a period, and is then reduced to zero torque capacity along a second ramp 114.

At step 116, sleeve 86 of coupler 82 is moved leftward to a disengaged position out of engagement with pinion 78 and discontinuing operation in fifth gear, and sleeve 84 of coupler 80 is moved leftward into engagement with pinion 74, thereby disposing transmission 16 to operate in third gear.

At step 118, ERAD 22 begins to produce output torque. FIG. 4B shows that the torque output by ERAD 22 first increases along a ramp 120 during period 121 to a magnitude 122, which is held constant for a period 123, and is then reduced to zero torque capacity along a ramp 124 during period 125. The torque capacity increase along ramp 120 during period 121 is concurrent with ramp 114. The torque cross linking shown in FIG. 4B ensures a smooth transition in torque.

At step 126, a transfer of torque from ERAD 22 to input clutch 45 occurs as the ERAD torque decreases to zero torque and the torque capacity of input clutch increases along the rise 128.

At step 130, input clutch 45 is closed such that its torque capacity increases rapidly along a rise 128 to a fully engaged torque capacity 132, which is maintained and held constant.

Figure 4A:
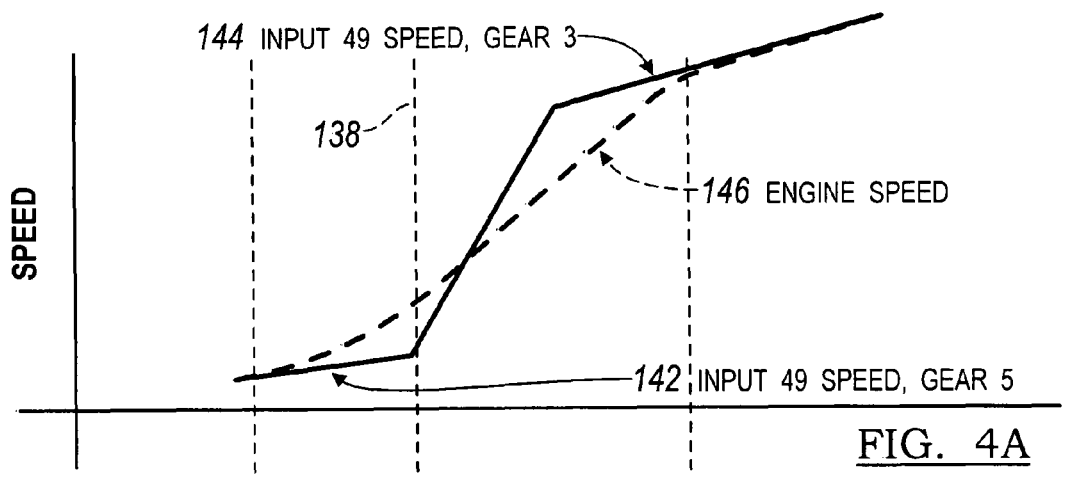
FIG. 4A illustrates the variation of input shaft speed and engine speed during a power-on, double-step gearshift from fifth gear to third gear.
Figure 4B:
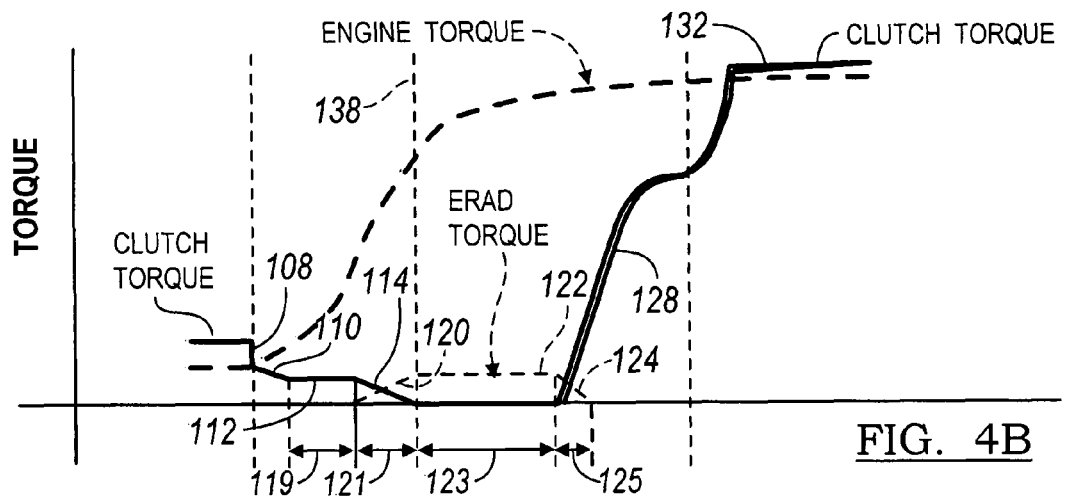
FIG. 4B illustrates the variation of input clutch torque capacity, ERAD torque and engine torque during the gear shift of shown in FIG. 4A.
Figure 4C:
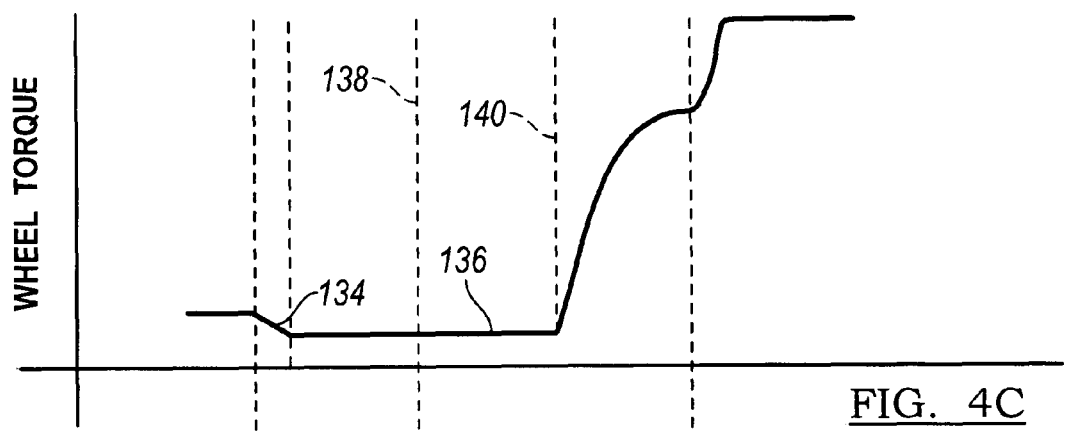
FIG. 4C illustrates the variation of output torque during the gear shift of shown in FIG. 3A.

FIG. 4C illustrates that the magnitude of torque transmitted by output 24 decreases only slightly at 134 when input clutch 45 has its torque capacity reduced. The magnitude of torque transmitted by output 24 is a constant magnitude 136 during the downshift transition from fifth gear to third gear operation.

In FIGS. 4A-4C, vertical line 138 represents the point in time when fifth gear operation ends and vertical line 140 represents the point in time when third gear operation begins. The output torque produced by ERAD 22 during the downshift is a maximum when the transition from fifth gear to third gear occurs.

FIG. 4A illustrates the speed change of input 49 due to the change from fifth gear 142 to third gear 144, and the variation of engine speed 146.

Input clutches 40, 45 cannot be fully engaged at the same time or the resulting tie-up would damage the transmission 16. When a gearshift occurs, the input clutches 40, 45 must smoothly, synchronously transfer torque between shafts 44, 49. Without synchronous torque transfer from one shaft to the other the result would be loss of torque to the wheels during the gearshift.

Commanding torque from ERAD 22 can be prepared ahead of the gear shift since the scheduled shift is already known. ERAD 22 is a fast torque device that is used to provide torque to the wheels during a transition from fifth gear to third gear. The ERAD torque is then ramped off with reengagement of clutch 45. Using ERAD to fill in torque bypasses the intermediate shift into $4^{th}$ gear resulting in a significantly faster double step shift.

Although the invention has been described with reference to a powershift transmission, the invention is applicable to any conventional manual transmission, automatic shift manual transmission, or automatic transmission that has no torque converter located in a power path between the engine and transmission input. The input clutches 40, 45 of the powershift transmission 16 may be hydraulically actuated wet clutches, or they may be electrically or electromagnetically actuated dry clutches.

Figure 5:
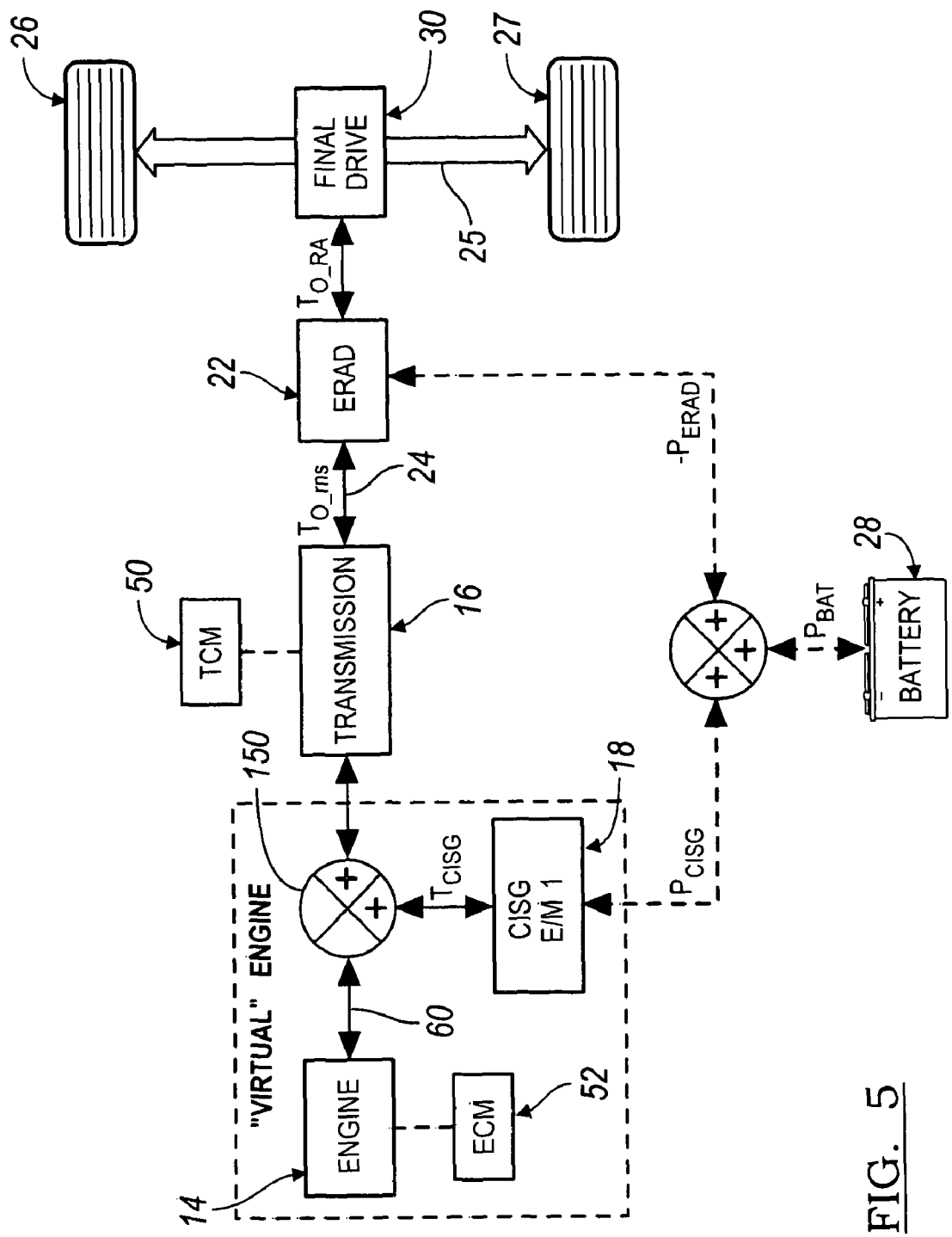
FIG. 5 is an alternate schematic diagram of the vehicle powertrain of FIG. 1.

FIG. 5 illustrates schematically the powertrain of FIG. 1, in which the transmission output 24 is driveably connected both to the front wheels 34, 35 through differential 36, and to ERAD 22, which is driveably connected through differential 30 to the rear wheels 26, 27. Torque produced at the output 60 of engine 14 and at the output of CISG 18 is transmitted to 150 for delivery to the transmission input 20.

FIG. 6 illustrates schematically a second embodiment of the powertrain, in which the transmission output 24 is driveably connected through differential 36 to drive the front wheels 34, 35 only. Torque produced at the output 60 of engine 14 and at the output of CISG 18 is transmitted to 150 for delivery to the transmission input 20. ERAD 22 drives the rear wheel 26, 27.

FIG. 7 illustrates schematically a third embodiment of the powertrain, in which the transmission output 24 is driveably connected to EFAD 152, whose output 154 drives the front wheels 34, 35 through differential 36. Torque produced at the output 60 of engine 14 and at the output of CISG 18 is transmitted to 150 for delivery to the transmission input 20.

Although the method has been described with reference to a 5-3 power-on downshift, the control method and system can be applied to any double step gearshift.

In accordance with the provisions of the patent statutes, the preferred embodiment has been described. However, it should be noted that the alternate embodiments can be practiced otherwise than as specifically illustrated and described.

What is claimed is:

1. A gearshift method comprising:
   (a) opening a transmission input clutch;
   (b) disconnecting a current gear;
   (c) connecting a target gear to a load;
   (d) using electric machine torque to drive the load;
   (e) closing the input clutch;
   (f) reducing electric machine torque;
   (g) reducing input clutch torque capacity in a step change and subsequent first ramp during a first period;
   (h) maintaining said torque capacity constant during a second period.

2. The method of claim 1 further including the step of further reducing the torque capacity of the input clutch along a second ramp until said torque capacity is reduced to zero.

3. The method of claim 1 wherein step (d) further includes the steps of:
   increasing the torque produced by the electric machine along a third ramp during a third period; and
   maintaining constant the torque produced by the electric machine during a fourth period following the third.

4. The method of claim 1 wherein step (f) further includes the step of increasing the torque capacity of the input clutch along a fourth ramp until the torque produced by the electric machine is reduced to zero.

5. The method of claim 1 wherein step (b) further includes the steps of:
   disengaging from the current gear a coupler that is driveably connected with the output; and
   engaging the coupler with the target gear.

6. The method of claim 1 wherein step (b) further includes the step of disengaging from the current gear a second coupler that is driveably connected with the output from the current gear.

7. In a powertrain for a vehicle that includes an engine, a transmission having an input, a current gear, an input clutch, a target gear and an output for driving a load, and an electric machine for driving the load, a method for performing a gearshift from the current gear to the target gear comprising the steps of:
   (a) reducing a torque capacity of the input clutch to a magnitude that produces a predetermined torque at the load;
   (b) releasing a drive connection between the current gear and the output;
   (c) producing a drive connection between the target gear and the output;
   (d) using the electric machine to generate torque at a magnitude that produces the predetermined magnitude at the load;
   (e) closing the input clutch; and
   (f) reducing the torque produced by the electric machine
   (g) reducing input clutch torque capacity in a step change and subsequent first ramp during a first period;
   (h) maintaining input clutch torque capacity constant during a second period.

8. The method of claim 7 further including the step of further reducing the torque capacity of the input clutch along a second ramp until said torque capacity is reduced to zero.

9. The method of claim 7 wherein step (d) further includes the steps of:
   increasing the torque produced by the electric machine along a third ramp during a third period; and
   maintaining constant the torque produced by the electric machine during a fourth period following the third.

10. The method of claim 7 wherein step (f) further includes the step of increasing the torque capacity of the input clutch along a fourth ramp until the torque produced by the electric machine is reduced to zero.

11. The method of claim 7 wherein step (b) further includes the steps of:
    disengaging from the current gear a coupler that is driveably connected with the output; and
    engaging the coupler with the target gear.

12. A system for controlling a gearshift in a vehicle powertrain that drives a load, comprising:
    a transmission able to operate in a current gear and a target gear and including an input and an output;
    an engine driveably connected to the input;
    an electric machine driveably connected to the load;
    an input clutch for alternately closing and opening a drive connection between the engine and the output; and a controller configured to reduce a torque capacity of the input clutch to a magnitude that produces a predetermine torque at the load, release a drive connection between the current gear and the output, produce a drive connection between the target gear and the output, use the electric machine to generate torque at a magnitude that produces the predetermined magnitude at the load, close the input clutch, reduce the torque produced by the electric machine, reduce input clutch torque capacity in a step change and subsequent first ramp during a first period, and maintaining input clutch torque capacity constant during a second period.

13. The system of claim 12 wherein the controller is further configured to further reduce the torque capacity of the input clutch along a second ramp until said torque capacity is reduced to zero.

14. The system of claim 12 wherein the controller is further configured to:
increase the torque produced by the electric machine along a third ramp during a third period; and
maintain constant the torque produced by the electric machine during a fourth period following the third period.

15. The system of claim 12 wherein the controller is further configured to increase the torque capacity of the input clutch along a fourth ramp until the torque produced by the electric machine is reduced to zero.

16. The system of claim 12 wherein the controller is further configured to disengage from the current gear a coupler that is driveably connected with the output and to engage the coupler with the target gear.

17. A system for controlling a gearshift in a vehicle powertrain, comprising:
a transmission able to operate in a current gear and a target gear and including an input and an output connected to a load;
an engine driveably connected to the input;
a first electric machine driveably connected to the input;
a second electric machine driveably connected to the load;
an input clutch for alternately closing and opening a drive connection between the input and the output; and
a controller configured to reduce a torque capacity of the input clutch to a magnitude that produces a predetermine torque at the load, release a drive connection between the current gear and the output, produce a drive connection between the target gear and the output, use the second electric machine to generate torque at a magnitude that produces the predetermined magnitude at the load, close the input clutch, and reduce the torque produced by the second electric machine, reduce input clutch torque capacity in a step change and subsequent first ramp during a first period, and maintain input clutch torque capacity constant during a second period.

18. The system of claim 17 wherein the controller is further configured to further reduce the torque capacity of the input clutch along a second ramp until said torque capacity is reduced to zero.

19. The system of claim 17 wherein the controller is further configured to:
increase the torque produced by the first electric machine along a third ramp during a third period; and
maintain constant the torque produced by the first electric machine during a fourth period following the third period.

20. The system of claim 17 wherein the controller is further configured to increase the torque capacity of the input clutch along a fourth ramp until the torque produced by the first electric machine is reduced to zero.

21. The system of claim 17 wherein the controller is further configured to disengage from the current gear a coupler that is driveably connected with the output and to engage the coupler with the target gear.

\* \* \* \* \*